(12) United States Patent
Hamp (10) Patent No.: US 10,876,480 B2
(45) Date of Patent: Dec. 29, 2020

(54) ACOUSTIC STRUCTURE FOR GAS TURBINE ENGINE

(71) Applicant: PRATT & WHITNEY CANADA CORP., Longueuil (CA)

(72) Inventor: Jason Hamp, Georgetown (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 147 days.

(21) Appl. No.: 16/265,345

(22) Filed: Feb. 1, 2019

(65) Prior Publication Data
US 2020/0248626 A1   Aug. 6, 2020

(51) Int. Cl.
*F02C 7/25* (2006.01)
*F02C 7/18* (2006.01)
*F02K 3/04* (2006.01)

(52) U.S. Cl.
CPC .................. *F02C 7/25* (2013.01); *F02C 7/18* (2013.01); *F02K 3/04* (2013.01); *F05D 2220/323* (2013.01); *F05D 2260/232* (2013.01); *F05D 2260/96* (2013.01)

(58) Field of Classification Search
CPC .... F02C 7/24; F02C 7/25; F02C 7/045; F02K 1/827; F02K 3/04; F05D 2260/96
See application file for complete search history.

(56) References Cited

U.S. PATENT DOCUMENTS

| | | | | |
|---|---|---|---|---|
| 3,664,612 A | * | 5/1972 | Skidmore et al. | F02C 7/042 244/53 B |
| 4,780,359 A | * | 10/1988 | Trask | B32B 7/12 442/224 |
| 7,467,687 B2 | * | 12/2008 | Mitchell | E04B 1/8218 181/200 |
| 9,416,752 B2 | * | 8/2016 | Joshi | F02K 1/827 |
| 9,909,501 B2 | * | 3/2018 | Caulfeild | F02C 7/25 |
| 2005/0274103 A1 | * | 12/2005 | Prasad | B64D 33/02 60/226.1 |
| 2007/0278035 A1 | * | 12/2007 | Mitchell | B63H 21/16 181/290 |
| 2012/0082808 A1 | * | 4/2012 | Lemains | F02C 7/24 428/34.1 |
| 2014/0133964 A1 | * | 5/2014 | Ayle | F02K 1/827 415/119 |
| 2017/0008623 A1 | * | 1/2017 | Lee | H04Q 9/00 |
| 2018/0156039 A1 | * | 6/2018 | Tallman | F01D 5/186 |
| 2018/0179899 A1 | * | 6/2018 | Garay | F01D 5/20 |
| 2019/0112978 A1 | * | 4/2019 | di Mare | F02C 7/042 |
| 2020/0095955 A1 | * | 3/2020 | Davis | B29C 43/36 |
| 2020/0223171 A1 | * | 7/2020 | Stecenko | B32B 5/02 |

* cited by examiner

*Primary Examiner* — Steven M Sutherland
*Assistant Examiner* — Rodolphe Andre Chabreyrie
(74) *Attorney, Agent, or Firm* — Norton Rose Fulbright Canada LLP

(57) ABSTRACT

A bypass air passage can be provided between a radially-outer wall of a bypass duct and an engine core, the radially-outer wall having a first, radially inner skin apertured and exposed to the bypass air passage, and a second skin radially-outwardly offset from the first skin, the second skin having an aperture blocked by a thermal fuse, wherein the thermal fuse is configured to melt upon reaching a threshold temperature, thereby opening a gas path from the bypass air passage across the second skin, via the aperture.

20 Claims, 5 Drawing Sheets

FIG. 4A

ACOUSTIC STRUCTURE FOR GAS TURBINE ENGINE

TECHNICAL FIELD

The application related generally to gas turbine engines and, more particularly, to a bypass duct acoustic structure therefore.

BACKGROUND OF THE ART

Acoustic structures are commonly used in bypass ducts of turbofan engines, to reduce a noise impact of the engine core to the environment. In order to protect the acoustic structures from the debilitating effects of fire, external blankets, coatings or metallic shields may be added to the acoustic structure. These protections are however structurally parasitic, i.e. they act only to thermally protect the underlying structure and do not play an active role in supporting any structural loading. These fire protections also include additional cost, complicated maintainability and access, can restrict inspectability and complicate reparability.

SUMMARY

In one aspect, there is provided a gas turbine engine comprising a bypass duct, a bypass air passage between a radially-outer wall of the bypass duct and an engine core, the radially-outer wall having a first, radially inner skin apertured and exposed to the bypass air passage, and a second skin radially-outwardly offset from the first skin, the second skin having an aperture blocked by a thermal fuse, wherein the thermal fuse is configured to melt upon reaching a threshold temperature, thereby opening a gas path from the bypass air passage across the second skin, via the aperture.

In another aspect, there is provided an acoustic structure for an aircraft, the acoustic structure having a first skin exposed to a first fluidic environment, the first skin being apertured, a second skin between the first skin and a second fluidic environment, an porous acoustic media sandwiched between the first skin and the second skin, the second skin having an aperture, and a thermal fuse blocking the aperture in the second skin, the thermal fuse being configured to melt upon reaching a target temperature to allow a flow from the first fluidic environment to the second fluidic environment across the aperture.

In a further aspect, there is provided a method of operating a gas turbine engine including pressurizing air in a bypass air passage between a radially-outer wall of a bypass duct and an engine core, the radially-outer wall having a first, radially inner skin apertured and exposed to the bypass air passage, and a second skin radially-outwardly offset from the first skin, maintaining, with the second skin, a pressure difference between the pressurized air in the bypass air passage and a nacelle cavity radially external to the second skin, the second skin having an aperture blocked by a thermal fuse; the thermal fuse melting upon reaching a predetermined temperature, opening a cooling path across the second skin, and cooling the second skin by circulation of cooling air flowing across the second skin.

DESCRIPTION OF THE DRAWINGS

Reference is now made to the accompanying figures in which.

DETAILED DESCRIPTION

Figure 1:
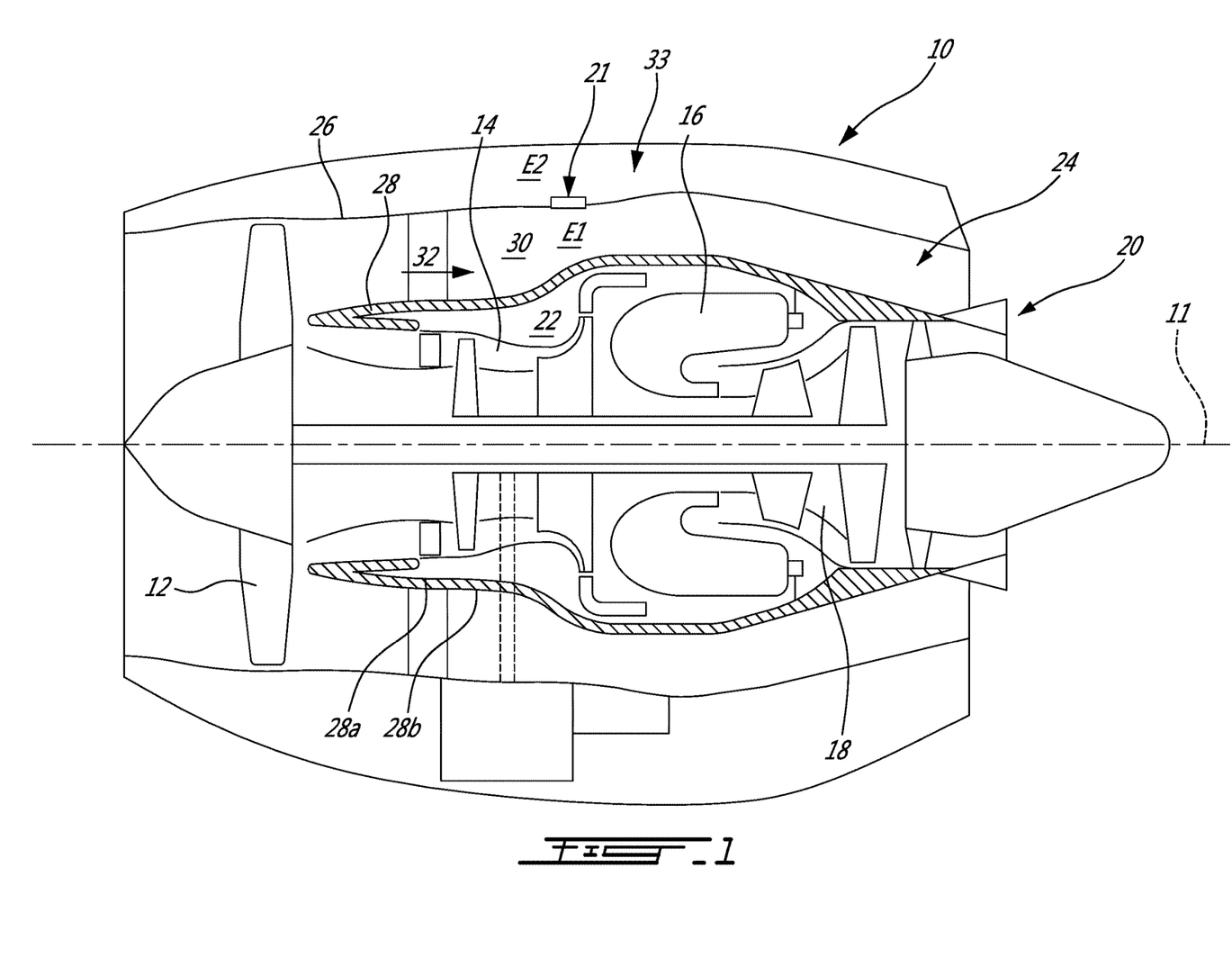
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The compressor section 14 and the turbine section 18 form part of an engine core 20. The engine core 20 defines a main fluid path 22 in which the combustor 16 is provided. The engine core 20 is coaxially positioned within an annular bypass duct 24 including an annular radially outer bypass duct wall 26 and an annular radially inner bypass duct wall 28. The radially outer and inner bypass duct walls 26 and 28 define there between an annular bypass air passage 30 for directing a bypass air flow 32 pressurized by the fan 12. The outer bypass duct wall 26 can perform a structural function in supporting and centering the engine core 20. The outer bypass duct wall 26 can be said to form part of an engine nacelle (or cowl), which also has a radially outer wall, and a cavity, which can be referred to as a bypass duct cavity or a nacelle cavity 33, for instance.

Figure 2:
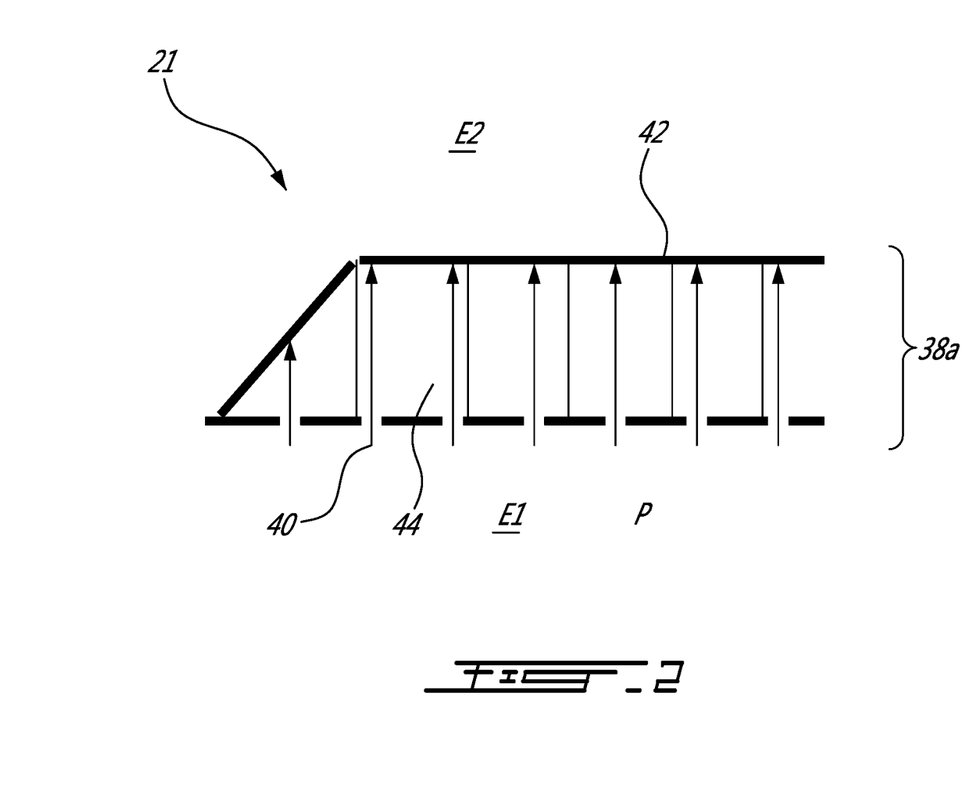
FIG. 2 is a schematic cross-sectional view of a radially outer wall of a gas turbine engine bypass duct.

FIG. 2 shows a portion 21 of radially outer bypass duct wall 26 of a gas turbine engine such as the gas turbine engine 10. More specifically, in this embodiment, the portion 21 of the radially outer bypass duct wall 26 is an acoustic structure 21, a partial cross-section of which is shown in FIG. 2. The acoustic structure 21 generally has a first skin 40, positioned radially-inwardly and forming a radially outer delimitation to the annular bypass air passage 30. The acoustic structure 21 has a sandwich construction, and further includes at least a second skin 42, with an acoustic media 44 sandwiched between the first skin 40 and the second skin 42. The acoustic media 44 is configured to attenuate noise coming from the engine fan 12 and/or engine core 20, and the first skin 40 is perforated to allow noise to communicate with the acoustic media 44, for the noise to be attenuated by the acoustic media 44 rather than resonating within the bypass duct or fully traversing the nacelle.

The air in the bypass air passage 30 is compressed by the fan 12 during operation of the engine, and a pressure differential is thus typically created between the bypass air passage 30, which forms a first fluidic environment E1 and the bypass duct/nacelle cavity 33, which forms a second fluidic environment E2. The second skin 42 can be designed as a pressure-containing skin to perform the function of partitioning fluidic environment E1 from fluidic environment E2 during typical operation conditions, and thereby contribute in maintaining the pressure differential between the two environments. The second skin 42 can be pressure load bearing. The first skin 40 and the second skin 42 can form a sandwich structure, with the edges of the second skin 42 secured to the first skin 40, for instance, in a manner to both allow a sealing function of the second skin 42, and to perform a structural function, for instance.

When in use, the acoustic structure 21 is on one side exposed to the first fluidic environment E1, and on another side to a second fluidic environment E2 of the gas turbine engine 10. The first fluidic environment E1 is an environment subject to sounds, such as the sounds originating from the combustor 16 or the fan 12. The second fluidic environment E2 is an environment that could potentially be under kerosene fire. The first fluidic environment E1 is under a pressure higher than that of the second fluidic environment E2. In one embodiment, the second fluidic environment E2 is at ambient pressure.

Figure 3A:
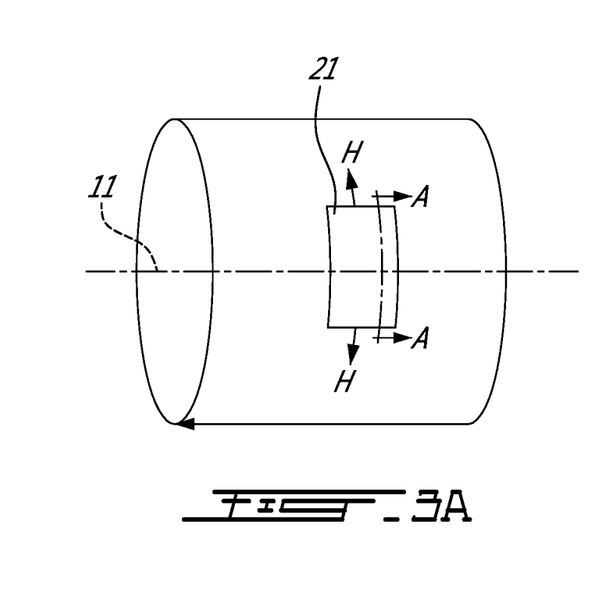
Figure 3B:
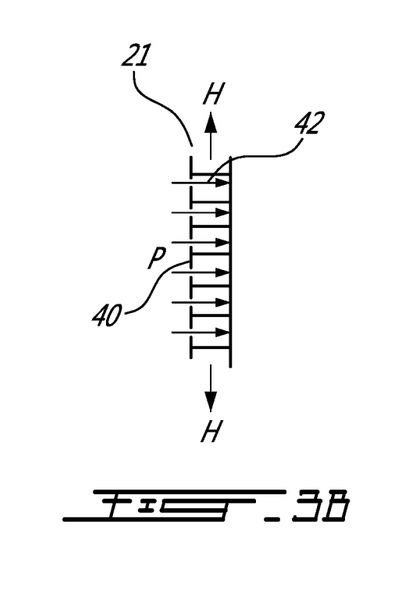
FIGS. 3B and 3C are schematic cross-sectional views of the radially-outer wall of FIG. 2, during typical operating conditions and during a fire attack, respectively, with FIG. 3A schematizing free space orientation thereof.

Referring to FIG. 3B, when in use, the acoustic structure 21 is subject to pressure loads P induced by the higher pressured first fluidic environment E1, and to mechanical loads H originating from components of the engine 10 where the acoustic structure 21 is used. The mechanical loads H may be tension or compression or shear or any of the above depending where the acoustic structure 21 is used (e.g. rear mount structure, thrust reverser weight, drag). The mechanical loads H are at an angle with respect to the pressure loads P, possibly normal thereto, depending on the application. The pressure loads P may vary during the course of use of the acoustic structure 21 depending on a regime of the gas turbine engine 10.

In this embodiment, the acoustic structure can be said to include a noise reduction layer 38*a* including an inner skin 40 in contact with the first fluidic environment E1 and a noise reduction media 44 and the second skin 42. The environments E1 and E2 include, in one embodiment, fluid flow such that the inner skin 40 could be a flow boundary surface for the fluid flow and form part of an aerodynamic surface for guiding the flow of fluid, such as air. In this embodiment, the second skin 42 is an outer skin of the acoustic structure 21.

The inner skin 40 is a perforated structural component of the acoustic structure 21. The inner skin 40 is a structural component in that it is a load-bearing wall of the acoustic structure 21, i.e. it carries some of the mechanical loads H. The inner skin 40 is perforated to allow the sound pressure to fill dead air cavities in the noise reduction 44 which acts as a sound damping muffler. The inner skin 40 could be made of any suitable material, considering any required loads/stresses and damage tolerance, taking into consideration the fact that it can be apertured. For instance, it can be made of metal or fiber matrix composite of carbon, glass, ceramic, boron, or kevlar with a thermoset or thermoplastic matrix. In one embodiment, the inner skin 40 is made of carbon fiber epoxy. In one embodiment, the inner skin 40 is made of aluminum. In one embodiment, the inner skin 40 is made of glass fibers.

The outer skin 42 can also be a structural component in that it is a load-bearing wall of the acoustic structure 21, i.e. it carries some of the mechanical loads H, and can also further support pressure loads P. The outer skin 42 could be made of any material resistant enough to support the stresses caused by the mechanical loads H. For instance, it can be made of metal or fiber matrix composite of carbon, glass, ceramic, boron, or kevlar with a thermoset or thermoplastic matrix. The outer skin 42 may be made of a fire retardant material. In one embodiment, the outer skin 42 is made of carbon fiber epoxy. In one embodiment, the outer skin 42 is made of aluminum. In one embodiment, the outer skin 42 is made of glass fibers. The inner and outer skins 40, 42 could or could not be made of a same material.

The outer skin 42 can be designed to be non-apertured during typical operating conditions and to support the pressure loading P transmitted through the perforations of the inner skin 40. The pressure resisting wall 42 is thick enough to support the pressure loads P without altering (e.g. buckling or bursting). The pressure resisting wall 42 could be made of any material resistant enough to support the stresses caused by the pressure loads P. In other embodiments, the pressure resisting wall 42 is a fibre and matrix composite, where the fibres could be, non-exhaustively carbon, glass, ceramic, boron, and where the matrix could be, non-exhaustively, organic polymer, ceramic, thermoset, thermoplastic, or metal. The pressure resisting wall 42 may be rigid or flexible.

A space between the inner skin 40 and the pressure resisting wall 42 may be filled with the noise reduction media 44. The noise reduction media 44 attenuates sounds coming from the first fluidic environment E1. A thickness of the noise reduction media 44 may be determined to absorb the required sound frequency(ies) of the sounds. The noise reduction media may be wood, metal or foam material or fiber matrix composite of based on any one or more of carbon, glass, ceramic, boron, kevlar with thermoset or thermoplastic matrix. It may be honeycomb or significantly porous structure as to not detrimentally impede the pressure differential cooling flow during a fire event.

In one embodiment, the noise reduction media 44 is a honeycomb structure. The honeycomb structure includes a plurality of dead air cavities which contributes to the noise reduction. In one embodiment, the honeycomb structure is made of aluminum, fiberglass or a fibrous material, aramid base, phenolic resin coated.

The inner skin 40, outer skin 42, and noise reduction media 44 may be mechanically fastened or bonded together. They are shown herein to be parallel to each other with a constant thickness. It is however contemplated that at least one of these components could be inclined relative to the others and that depending on the application, these components can have varying thicknesses.

Figure 3C:
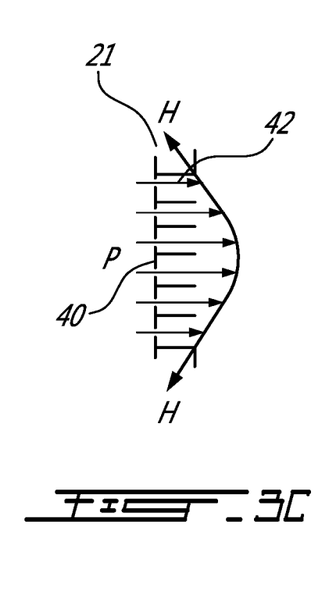

In typical operating conditions, the acoustic structure 21 behaves as an integral acoustic structure. However, during a fire attack from the bypass duct/nacelle cavity 33, the heat can disbond the second skin from the acoustic media, such as shown in FIG. 3C.

One way to prevent the pressure resisting wall from failing is to overdesign it, which may represent parasitic weight or cost considerations. Another approach is to provide a heat (fire) insulation layer radially outwardly of the acoustic layer, but this can also represent parasitic weight or cost considerations.

It was found that at least in some embodiments, it was possible to address this pressure resistance wall protection consideration at least partially via a thermal fuse approach. More specifically, referring to FIGS. 4A to 4C, a thermal fuse 146 can be used to block an aperture 148 in the pressure-resisting wall 142 of the acoustic structure 121 in a manner that upon the event of a fire attack, the thermal fuse 146 is designed to disintegrate (e.g. melt) and to open up a controlled cooling flow path across the aperture 148 in the pressure-resisting wall 142, as shown in FIG. 4C. In a typical embodiment, a plurality of thermal fuses can be placed in a plurality of corresponding apertures which, when melted, create a combined surface area of a controlled cooling flow path. The surface area of the controlled cooling flow path can be controlled in a manner for the amount of cooling flow and pressure equilibration to be limited, and to be considered allowable in the circumstances, by contradistinction with a flow rate which would occur upon the failure of the pressure resisting skin 142 itself, which would not be considered allowable. Moreover, as illustrated in FIG. 4C, the amount of controlled cooling flow which is allowed across the pressure resisting wall can be configured in a way for the cooling flow to perform a cooling function on the pressure resisting wall, increasing the pressure resisting wall's resistance to fire in such conditions. To this end, a plurality of thermal fuses can be disposed in an interspaced manner along the surface of the pressure resisting wall, and the distance between the thermal fuses can be selected in a manner for the thermal fuses to be close enough from one another in a manner to limit any occurrences of hot spots which could occur during a fire attack to acceptable levels.

In one embodiment, the thermal fuses 146 which blocks the aperture under normal conditions can be blind rivets, bolts, screws, plugs or any other suitable object. The thermal fuse material may be thermoplastic, thermoset, aluminum, brass, copper, lead, magnesium, tin, metal alloy or other suitable material, which can have a melting temperature selected in a manner to melt upon reaching a predetermined threshold temperature, maintaining minimum structural integrity requirements of the pressure resisting skin 142, considered suitable in view of the given application. Typically, the thermal fuse(s) will be a component distinct from the structure or skins of the engine, and will be provided in the form of a distinct "plug" which will be secured in a manner to block an aperture in a corresponding skin, i.e. will fill the aperture and be secured to the skin. The thermal fuse will have a melting temperature lower than the melting temperature of the skin, more likely significantly less than the melting temperature of the skin. The melting temperature of the thermal fuse(s) can be of 10% less, preferably 25%, more preferably 50% less than the melting temperature of the skin, for instance. If the outer skin 142, and acoustic media 44 are formed of a composite material, for instance, the transition glass temperature of the resin can be reached under a fire attack. Under such conditions the internal bypass air flow static pressure P can cause the outer skin 142 to disbond from the core (acoustic media) 44. The blind rivets can exceed their melting temperature. The internal bypass air positive static pressure can harmlessly eject the melting blind rivets into the bypass duct/nacelle cavity and prevent flame penetration through the open holes. This flow of air over the inside surface of the outer skin 142 causes convection cooling of the pressure resisting skin (which can be based on carbon fibers for instance), which maintains sufficient tensile strength to contain the static pressure load.

If conditions exist where there is no pressure P delta, the outer skin 142 hole pattern can be selected of a hole diameter which is an effective flame arrester, preventing flame penetration.

It will be understood that the aperture pattern across the pressure resisting skin, the aperture diameter/size, the material of the thermal fuses, and the materials used in forming the sandwich structure may change depending on the design application.

Figure 4A:
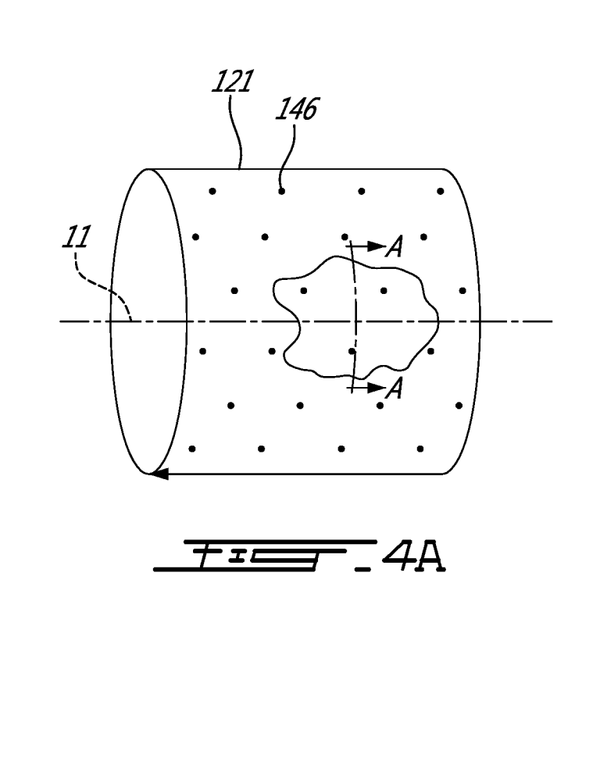
Figure 4B:
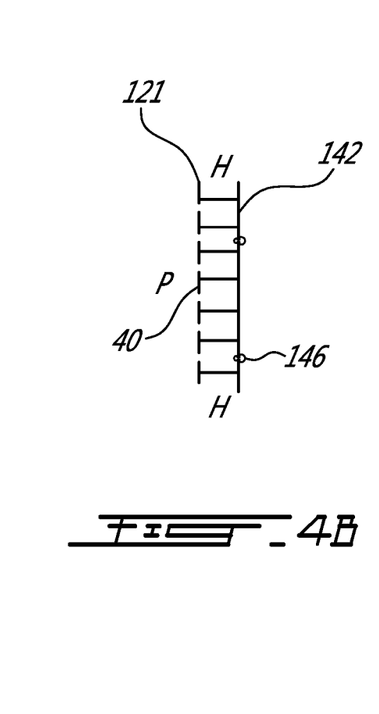
FIGS. 4B and 4C are schematic cross-sectional views of a radially-outer wall having thermal fuses, during typical operating conditions and during a fire attack, respectively, with FIG. 4A schematizing free space orientation thereof.
Figure 4C:
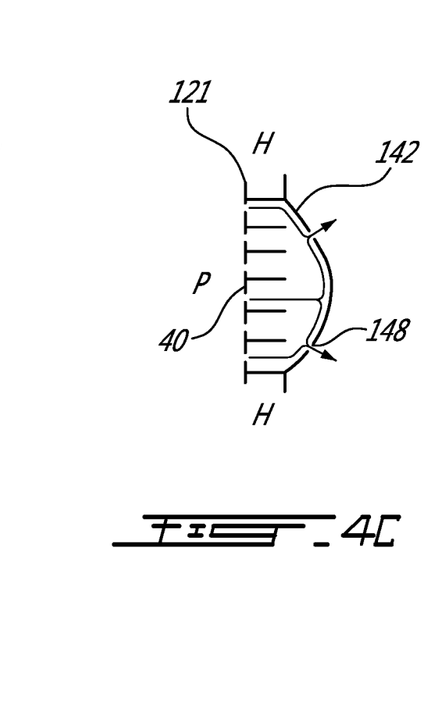

In the embodiment shown in FIGS. 4A to 4C, the sandwich structure 121 is a two-skin sandwich structure with an acoustic media there between, and the configuration of the apertures across the pressure-resisting radially-outer skin was considered sufficient to provide satisfactory heat protection to the pressure-resisting skin in the event of a fire in the nacelle cavity. The acoustic media was selected in a manner to be porous, allowing a flow rate of bypass air across i) the inner skin apertures, ii) the acoustic media pores and iii) the pressure-resisting skin apertures upon failure (melting) of the thermal fuses.

In an alternate embodiment, it can be preferred to provide additional heat protection to the pressure resisting skin or to the acoustic media. One possible way to address this, for instance, is by providing a fire-retardant layer radially-externally to the acoustic layer, between the acoustic layer and the nacelle cavity. The uses of thermal fuses, either in the skin which is radially external to the fire retardant layer, or intermediate between the fire retardant and the acoustic media, may be advantageous in such a scenario as well.

Figure 5:
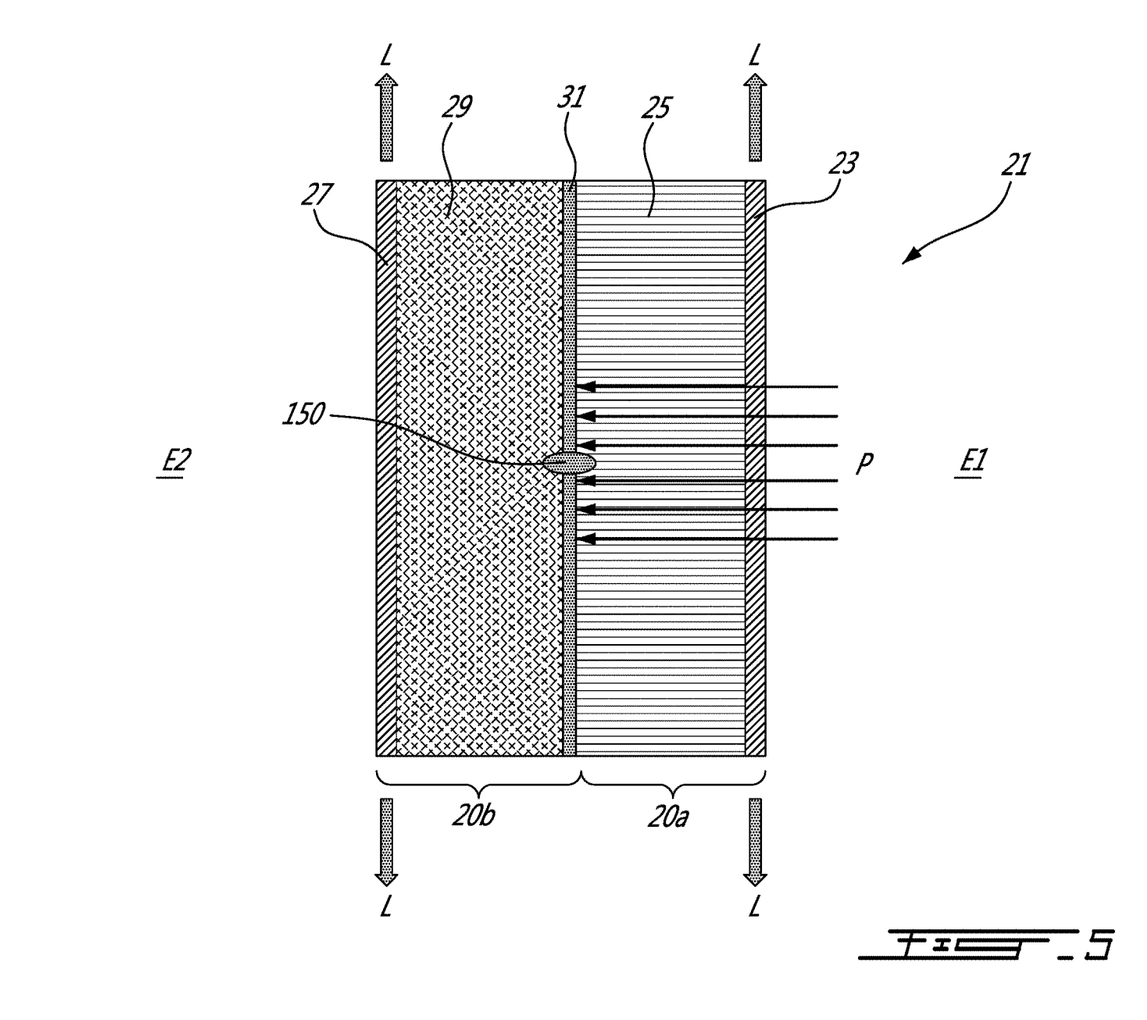
FIG. 5 is a schematic cross-sectional view of a radially outer wall of a gas turbine engine bypass duct, in accordance with another embodiment.

Such an example embodiment is presented in FIG. 5. In such an example, the first skin 23 can be apertured to allow sound to reach the acoustic media 25 in the first layer 20a. In a first example, the intermediate skin 31 can be a pressure-resisting skin, which can be provided with thermal fuses 150 which make it unapertured during typical operation, but which melt and open a cooling flow path in the event of a fire. In such an embodiment, both the acoustic media 25 and the fire protector media 29 can be porous, and the outer skin 27 can either be apertured or also be provided with thermal fuses which also melt to open a cooling flow path in the event of a fire. In a second example, the intermediate skin 31 can be permanently apertured, for instance, and thermal fuses can be provided in the outer skin 27, to open a cooling flow path in the event of a fire.

In accordance with such an example, as shown in FIG. 5, a fire protector layer 20b can include an outer skin 27 in contact with the second fluidic environment E2, a fire protector media 29 and a pressure resisting wall 31 disposed between the fire protector media 29 and the noise reduction media 25. Pressure resisting wall 31 is disposed between the inner skin 23 and the outer skin 27. The pressure resisting wall may prevent the outer skin 27 from experiencing the pressure loads P from the first fluidic environment E1. The pressure resisting wall 31, by protecting the outer skin 27 form the pressure loads P, may at least delay an alteration of the outer skin 27 by a fire in the second fluidic environment E2.

A space between the outer skin 27 and the pressure resisting wall 31 may be filled with the fire protector 29. The fire protector 29 can work to prevent heat transfer through radiation and can minimize the amount of oxygen present in the cavity it fills. A thickness of the fire protector 29 may be determined in function of the intended context of use. In one embodiment, the fire protector 29 is a fire retardant. In one embodiment, the fire protector 31 is a foam. In one embodiment, the fire protector 29 is an open cell foam. In one embodiment, the fire protector 29 is a gap of air. In one embodiment, the fire protector 29 is an aluminum honeycomb structure. In one embodiment, the fire protector 29 is a glass honeycomb structure. In one embodiment, the fire protector 29 is a glass bead filled resin. In one embodiment, the fire protector 29 is made of a thermal insulating material. Examples of thermal insulating materials include non-exhaustively balsa wood, silicone rubber, intumescent materials, aerogel materials, and fibrous ceramic paper. The acoustic and fire insulation features can be integrated into a double-layered construction to limit weight and potentially increase structural resistance. The noise reduction layer and the fire protector layer can be one of bonded and/or mechanically fastened together.

The inner skin 23, outer skin 27, pressure resisting wall 31, noise reduction 25 and fire protector 29 may be mechanically fastened and/or bonded together. Inner skin 23, outer skin 27, pressure resisting wall 31, noise reduction 25 and fire protector 29 are shown herein to be parallel to each other with a constant thickness. It is however contemplated that at least one of the inner skin 23, outer skin 27, pressure resisting wall 31, noise reduction 25 and fire protector 29 could be inclined and that depending on the application, the inner skin 23, outer skin 27, pressure resisting wall 31, noise reduction 25 and fire protector 29 could have varying thicknesses. The inner skin 23, outer skin 27 and pressure resisting wall 31, can be made of the same material, or of different materials.

The above description is meant to be exemplary only, and one skilled in the art will recognize that changes may be made to the embodiments described without departing from the scope of the invention disclosed. The gas turbine engine described herein is only one example of engine that may accommodate the acoustic structure. The acoustic structure may for example, be used in turboprop engines or any other engines where a fire resistant acoustic structure is needed. Depending on the engine, the acoustic structure 21 may also be used on thrust reversers, intermediate case, tailcone, jet pipes, fan cases, nacelle inlet, inner bypass ducts to name a few. Although the acoustic structure is shown here for use in a gas turbine engine, it is contemplated that the acoustic structure could be used in any environment where acoustic insulation on one side of the acoustic structure and fire insulation is required on the other side of the acoustic structure. Moreover, the thermal fuse concept used herein to provide a cooling flow in the event of a fire may be useful in other applications than acoustic structures. Indeed, even though the example presented above is applied to an acoustic structure, it will be understood that the concept can be used on other types of structures where the load bearing outer skin, exposed to fire attack, is normally insulated from a cooling flow. When a media is sandwiched between a first skin and second skin, the media material may be wood, metal, foam, fiber matrix composite of based on any one or more of carbon, glass, ceramic, boron, kevlar with thermoset or thermoplastic matrix. It may be honeycomb or a solid porous structure or an air gap or any other suitable material. Still other modifications which fall within the scope of the present invention will be apparent to those skilled in the art, in light of a review of this disclosure, and such modifications are intended to fall within the appended claims.

The invention claimed is:

1. A gas turbine engine comprising a bypass duct, a bypass air passage between a radially-outer wall of the bypass duct and an engine core, the radially-outer wall having a first, radially inner skin apertured and exposed to the bypass air passage, and a second skin radially-outwardly offset from the first skin, the second skin having an aperture blocked by a thermal fuse, wherein the thermal fuse is configured to melt upon reaching a threshold temperature, thereby opening a gas path from the bypass air passage across the second skin, via the aperture.

2. The gas turbine engine of claim 1 wherein the first skin and the second skin are secured to one another, further comprising a porous acoustic media sandwiched between the first skin and the second skin.

3. The gas turbine engine of claim 2 wherein the acoustic media is made of wood, metal, foam material, or of a fiber matrix composite of carbon glass, ceramic, boron or kevlar with a thermoset or thermoplastic matrix.

4. The gas turbine engine of claim 2 wherein the acoustic media is a honeycomb having open cells extending normal to the first skin.

5. The gas turbine engine of claim 1 wherein the second skin is exposed to a nacelle cavity.

6. The gas turbine engine of claim 1 wherein the second skin is a pressure resisting skin and prevents through fluid flow unless the thermal fuse has melted.

7. The gas turbine engine of claim 1 wherein the second skin has a plurality of apertures blocked by a corresponding plurality of thermal fuses.

8. The gas turbine engine of claim 1 further comprising a third skin radially-outwardly offset from the second skin, and a porous fire retardant media between the third skin and the second skin, the third skin being apertured.

9. The gas turbine engine of claim 8 further comprising a plurality of thermal fuses blocking a corresponding plurality of apertures in the third skin.

10. The gas turbine engine of claim 1 further comprising a third skin between the second skin and the first skin, and a porous fire retardant media between the third skin and the second skin, the third skin being apertured.

11. The gas turbine engine of claim 1 wherein the thermal fuse is a thermoplastic blind rivet.

12. The gas turbine engine of claim 1 wherein the first skin and the second skin are made of metal or fiber matrix composite of carbon, glass, ceramic, boron and/or kevlar with a thermoset or thermoplastic matrix.

13. An acoustic structure for an aircraft, the acoustic structure having a first skin exposed to a first fluidic environment, the first skin being apertured, a second skin between the first skin and a second fluidic environment, an porous acoustic media sandwiched between the first skin and the second skin, the second skin having an aperture, and a thermal fuse blocking the aperture in the second skin, the thermal fuse being configured to melt upon reaching a target temperature to allow a flow from the first fluidic environment to the second fluidic environment across the aperture.

14. The acoustic structure of claim 13 wherein the first skin and the second skin are secured to one another.

15. The acoustic structure of claim 13 wherein the second skin is a pressure resisting skin and prevents through fluid flow unless the thermal fuse has melted.

16. The acoustic structure of claim 13 wherein the second skin has a plurality of apertures blocked by a corresponding plurality of thermal fuses.

17. The gas turbine engine of claim 1 further comprising a third skin offset from the second skin, and a porous fire retardant media between the third skin and the second skin, the third skin being apertured.

18. The gas turbine engine of claim 17 further comprising a plurality of thermal fuses blocking a corresponding plurality of apertures in the third skin.

19. The gas turbine engine of claim 18 wherein the thermal fuse is a thermoplastic blind rivet.

20. A method of operating a gas turbine engine including
pressurizing air in a bypass air passage between a radially-outer wall of a bypass duct and an engine core, the radially-outer wall having a first, radially inner skin apertured and exposed to the bypass air passage, and a second skin radially-outwardly offset from the first skin,
maintaining, with the second skin, a pressure difference between the pressurized air in the bypass air passage and a nacelle cavity radially external to the second skin, the second skin having an aperture blocked by a thermal fuse;
the thermal fuse melting upon reaching a predetermined temperature, opening a cooling path across the second skin, and cooling the second skin by circulation of cooling air flowing across the second skin.

* * * * *